US011878211B2

(12) United States Patent
Boddie

(10) Patent No.: US 11,878,211 B2
(45) Date of Patent: Jan. 23, 2024

(54) TRAINING AND REHABILITATION DEVICE

(71) Applicant: MY TOTAL SHOULDER, INC., Pembroke, MA (US)

(72) Inventor: Micolene Boddie, Norwell, MA (US)

(73) Assignee: MY TOTAL SHOULDER, INC., Pembroke, MA (US)

(*) Notice: Subject to any disclaimer, the term of this patent is extended or adjusted under 35 U.S.C. 154(b) by 0 days.

(21) Appl. No.: 17/844,862

(22) Filed: Jun. 21, 2022

(65) Prior Publication Data

US 2022/0314066 A1 Oct. 6, 2022

Related U.S. Application Data

(63) Continuation of application No. 16/531,994, filed on Aug. 5, 2019, now Pat. No. 11,383,129, which is a (Continued)

(51) Int. Cl.

| | |
|---|---|
| ***A63B 23/12*** | (2006.01) |
| ***A63B 21/00*** | (2006.01) |
| ***A63B 24/00*** | (2006.01) |
| ***A61H 1/02*** | (2006.01) |
| ***A63B 21/055*** | (2006.01) |

(52) U.S. Cl.

CPC ....... *A63B 23/1245* (2013.01); *A61H 1/0281* (2013.01); *A63B 21/0552* (2013.01); *A63B 21/4049* (2015.10); *A63B 24/0062* (2013.01); *A63B 24/0087* (2013.01); *A61H 2201/1261* (2013.01); *A61H 2201/1623* (2013.01); *A61H 2201/1638* (2013.01); *A61H 2203/0406* (2013.01); *A61H 2203/0431* (2013.01); *A61H 2203/0456* (2013.01);

(Continued)

(58) Field of Classification Search

CPC ............ A63B 23/1245; A63B 24/0087; A63B 71/0054; A63B 21/0552; A63B 21/4049; A63B 24/0062; A63B 2071/0072; A63B 2213/00; A63B 2208/0242; A63B 2208/0204; A61H 1/0274; A61H 1/0281; A61H 2201/1215; A61H 2201/5069; A61H 1/0277; A61H 2201/1635; A61H 2201/1642; A61H 2201/1638; A61H 2201/1676; A61H 1/0285; A61H 2205/00

USPC ................................................ 482/4; 601/33

See application file for complete search history.

(56) References Cited

U.S. PATENT DOCUMENTS 2,760,774 A * 8/1956 Perez ................ A63B 21/4015 482/79
3,662,602 A * 5/1972 Weiss .................. A63B 23/129 482/905

(Continued)

FOREIGN PATENT DOCUMENTS

CN 102292060 1/2009
CN 10559790 1/2016

(Continued)

*Primary Examiner* — Andrew S Lo
(74) *Attorney, Agent, or Firm* — Troutman Pepper Hamilton Sanders LLP (Rochester)

(57) ABSTRACT

A device for training and rehabilitation of a limb is provided. The device provides a board with a plurality of movement tracks to allow for controlled movement of the limb in various directions. Blockers and other controlling structures may be arranged on the device to limit range of motion of the movement of the limb.

18 Claims, 7 Drawing Sheets

Related U.S. Application Data continuation of application No. 15/351,013, filed on Nov. 14, 2016, now Pat. No. 10,413,778.

(52) U.S. Cl.
CPC ................. *A63B 2208/0204* (2013.01); *A63B 2208/0242* (2013.01); *A63B 2213/00* (2013.01)

(56) References Cited

U.S. PATENT DOCUMENTS 4,089,520 A * 5/1978 Ozbey ................ A63B 21/4047 482/130
4,108,429 A * 8/1978 Minichiello ........... A63B 21/04 482/130
4,772,015 A 9/1988 Carlson
4,822,027 A * 4/1989 Kascak .............. A63B 21/0552 482/901
4,944,502 A 7/1990 Collins
4,944,508 A * 7/1990 Collins .............. A63B 21/4035 482/121
5,241,952 A * 9/1993 Ortiz .................. A63B 21/4015 601/40
5,251,644 A * 10/1993 Fitzgerald ................ A61B 5/16 273/287
5,374,226 A * 12/1994 Grahm ................... A63B 23/16 601/40
5,391,132 A * 2/1995 Greenwald ........ A63B 21/4047 482/114
D361,621 S * 8/1995 Johnson ....................... D24/188
5,520,615 A * 5/1996 Fontana ............... A61H 1/0281 482/131
5,549,520 A * 8/1996 Grahm ................... A63B 23/16 482/44
5,645,521 A * 7/1997 Hepburn ............ A63B 21/4045 482/136
5,713,370 A * 2/1998 Cook ..................... A61B 5/389 600/595
5,839,991 A * 11/1998 Hall ....................... A63B 23/00 482/910
6,007,500 A * 12/1999 Quintinskie, Jr. ... A61H 1/0281 601/84
7,393,310 B2 * 7/2008 Andrews ............ A63B 23/1245 482/131
7,824,317 B2 * 11/2010 Nakamura ......... A63B 21/4047 482/134
8,251,879 B2 * 8/2012 Binns ................... A61H 1/0281 482/904
8,425,437 B2 4/2013 Zaborowski
8,545,373 B2 * 10/2013 Borden ................ A61H 1/0281 482/905
8,612,010 B2 12/2013 Simmons
9,604,094 B2 * 3/2017 Kosyan .............. A63B 21/4039
10,391,350 B2 * 8/2019 Thorpe ................ A63B 71/023
10,413,778 B2 * 9/2019 Boddie .............. A63B 21/0552
2002/0107116 A1 * 8/2002 Schulz ............... A63B 23/1245 482/97
2003/0028130 A1 * 2/2003 Wunderly ............ A61H 1/0274 482/4
2008/0248927 A1 * 10/2008 Ivey ..................... A61H 1/0285 482/44
2010/0234776 A1 * 9/2010 Borden ................ A61H 1/0281 601/33
2011/0230800 A1 * 9/2011 Binns ................... A61H 1/0281 601/5
2011/0300994 A1 * 12/2011 Verkaaik ................... G06F 3/03 482/51
2011/0319232 A1 * 12/2011 Thorpe .............. A63B 21/4011 482/91
2013/0284182 A1 10/2013 Valdez
2014/0296654 A1 10/2014 Breen
2018/0055708 A1 * 3/2018 Hatch .................. A61G 13/124
2018/0133546 A1 * 5/2018 Boddie .............. A63B 21/0552
2018/0264312 A1 * 9/2018 Pompile ............. A63B 21/4049

FOREIGN PATENT DOCUMENTS

WO 1986003981 7/1986
WO 20140109717 7/2014

* cited by examiner

TRAINING AND REHABILITATION DEVICE

BACKGROUND OF THE INVENTION

Field of the Invention

The present invention relates generally to devices for physical training and rehabilitation. More particularly the present invention relates to a device that controls multiple motions and ranges of motions for the purposes of physical training and/or rehabilitation of a body part or joints of the body part.

Description of Related Art

After many types of injuries, physical therapy is required to restore an injured member to previous capability. Commonly, various exercise devices or activities may be used by the therapist to achieve this restored functionality.

Shoulder injuries are common injuries treated by therapy. The shoulder joint is very complex and subject to a number of motions, actions, and activities that can cause injury. Because of the complexity of the shoulder and its myriad movements, rehabilitation in a controlled, isolated, and specific manner can often be quite difficult. Further, when rehabilitating the shoulder, specific limited movement ranges are generally desired. However, existing treatments at best only estimate these movement ranges.

Therefore, what is needed is a limb rehabilitation device that can specifically control movement ranges in a number of different movement direction.

SUMMARY OF THE INVENTION

The subject matter of this application may involve, in some cases, interrelated products, alternative solutions to a particular problem, and/or a plurality of different uses of a single system or article.

In one aspect, a device for guided limb movement is provided. The device comprises a limb movement board. On this board are a plurality of track apertures along one or more movement ranges of the limb. A blocker is positionable on the board to limit movement along one or more of the plurality of track apertures. A limb rest/stabilizer is connected to the board and is movable along one of the plurality of movement ranges. As such, a limb may be positioned on the limb rest/stabilizer, and may be moved along the one of the plurality of tracks that define the movement ranges. In this manner, a controlled movement of the limb and/or joint being trained or rehabilitated can be achieved.

In another aspect, a device for guided shoulder training is provided. The device has a limb movement board over which an arm may move for controlled and guided shoulder training and/or rehabilitation. An arm stabilizer configured to receive an arm of the user is connected to the board and is movable along at least one of a plurality of movement ranges. A blocker is positionable on the board. This blocker is positioned to limit a motion of the arm stabilizer by blocking the arm stabilizer path when moving along the at least one of the plurality of movement ranges. In a particular embodiment, the arm stabilizer is pivotally movable along a top surface of the board, and is pivotally connected to the board at a proximal end such that a swiveling motion of the arm stabilizer is provided.

DETAILED DESCRIPTION

Figure 1:
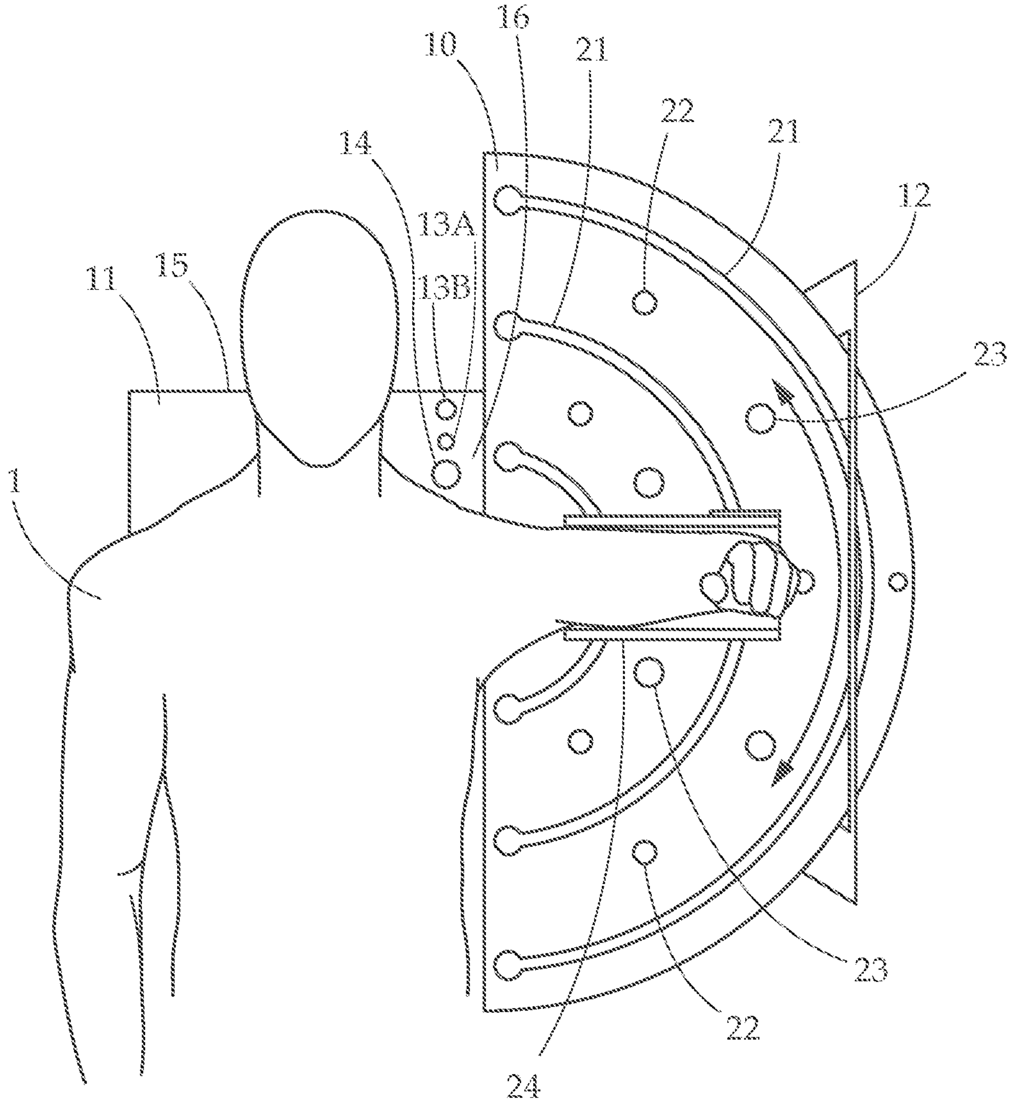
FIG. 1 provides an elevation view of an embodiment of the present invention.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

Generally, the present invention concerns an adjustable board that allows controlled and customizable ranges of motion of a limb along a top surface of the board. In further embodiments, an axial rotation track may be provided to provide controlled and customizable axial ranges of motion of the limb. In varying embodiments, the board may utilize pegs or similar blockers to limit movement of the limb on the board. Further, tracks may be provided in the board to guide and control proper movement of the limb. During use, the limb may be positioned on a stabilizer which may be connected to the board directly, via one or more of the tracks, in a pivotable manner, or connected to the axial rotation track, among other options.

In a particular embodiment, the present invention may be used as a shoulder rehabilitation device. In this embodiment, the board, along with controlling blockers and tracks, may be used to aid and strengthen shoulder adduction and abduction. An arm stabilizer may be movable in limited or free motion on this board. Further, the axial track may be utilized to aid and strengthen internal and external shoulder rotation in a guided fashion along this track. Further, the track may be adjusted to be at various angles of shoulder adduction or abduction so that rotation may be aided and strengthened at these various angles.

In some embodiments, a goniometer may be utilized on parts of the present invention to control movement and identify appropriate movement ranges. Further, the goniometer may be controllable to program or set the ranges of motions through which the limb is allowed to move.

In certain embodiments, the goniometer may comprise an electronic alerting mechanism that provides an indication (such as audible, tactile, or visual) when a desired angle has been achieved or reached. Such a goniometer may be programmable depending on a user's training or rehabilitation needs, in some embodiments.

The shoulder-applied embodiment of the present invention may be used when a user is lying flat, standing up, sitting, or in any position in between. Further, the board typically may be parallel to a user's back, but in some embodiments, the board may be angled (+/−90 degrees) towards a user's front or back to adjust an angle of the arm when being trained on the machine. This angling may be achieved by, for example, a hinged or pivoting structure.

As such, the present invention provides a highly customizable tool to guide training or rehabilitation limb movement in a controlled manner. The device is highly customizable to allow for various limb motions, and ranges of motion.

Turning now to FIG. 1, an embodiment of a shoulder-implemented version of the present invention is provided. In this view a user 1 is resting on a table 11. To the user's 1 left is a board 10 removably or permanently attached to the table 11 on a side edge 16 of the table 11. As noted above, the angle of the board 10 relative to the table 11 may be adjusted, and in this view is parallel with the table. The board 10 has a semicircular shape mimicking the range of motion of the user's humerus in an abduction and adduction shoulder motion. In this embodiment, the board 10 has three tracks 21. A pin or other engaging structure (not shown) may fit into one or more of these tracks to guide motion of the arm stabilizer 24 along the tracks. As such, an abduction and adduction motion can be achieved in a controlled, guided manner using the invention (as indicated by arrows). On the table 11 are a plurality of peg holes 13A, 13B, which hold shoulder peg 14. The shoulder peg 14 prevents a user's shoulder from shrugging up when the device is in use. To accommodate for variously sized users, the shoulder peg 14 may fit into any of the plurality of peg holes 13. Accordingly, the shoulder blocker can be positioned in a number of various positions along a plane of the table, including a first position 13A and second position 13B. As can be seen, the second position 13B is closer to the top edge 15 than the first position 13A. The first position 13A and second position 13B are adjacent to one another and aligned on an axis approximately parallel to the side edge 16.

In many cases of training or rehabilitation, a limited range of motion is desired so as to not over extend a healing or training joint and corresponding muscles. To limit motion of the arm stabilizer 24, a peg 23 or series of pegs 23 (or similar blocking structures) may be placed in various peg holes 22 on the board 10. The peg holes 22 are apertures formed in the board to allow a peg 23 to rest within. Peg holes 22 are arranged at multiple various angles and places on the board. To limit and customize motion of a training user's shoulder and arm, the pegs 23 can be selectively placed on the board 10. In the embodiment shown, pegs 23 are placed to allow an approximately 30 degree range of motion in both the abducting and adducting direction.

An axial rotation track 12 is configured to allow customizable and controlled internal and external rotation on the arm and shoulder. This track 12 can be connected to the board at varying positions to adjust the angle of the rotation. In this view, the track is positioned to guide shoulder rotation when the arm is straight out. In some embodiments, the track 12 may be slideable in its connection to the board 10, allowing a user's arm to abduct or adduct, and then rotate at various positions and angles.

Figure 2:
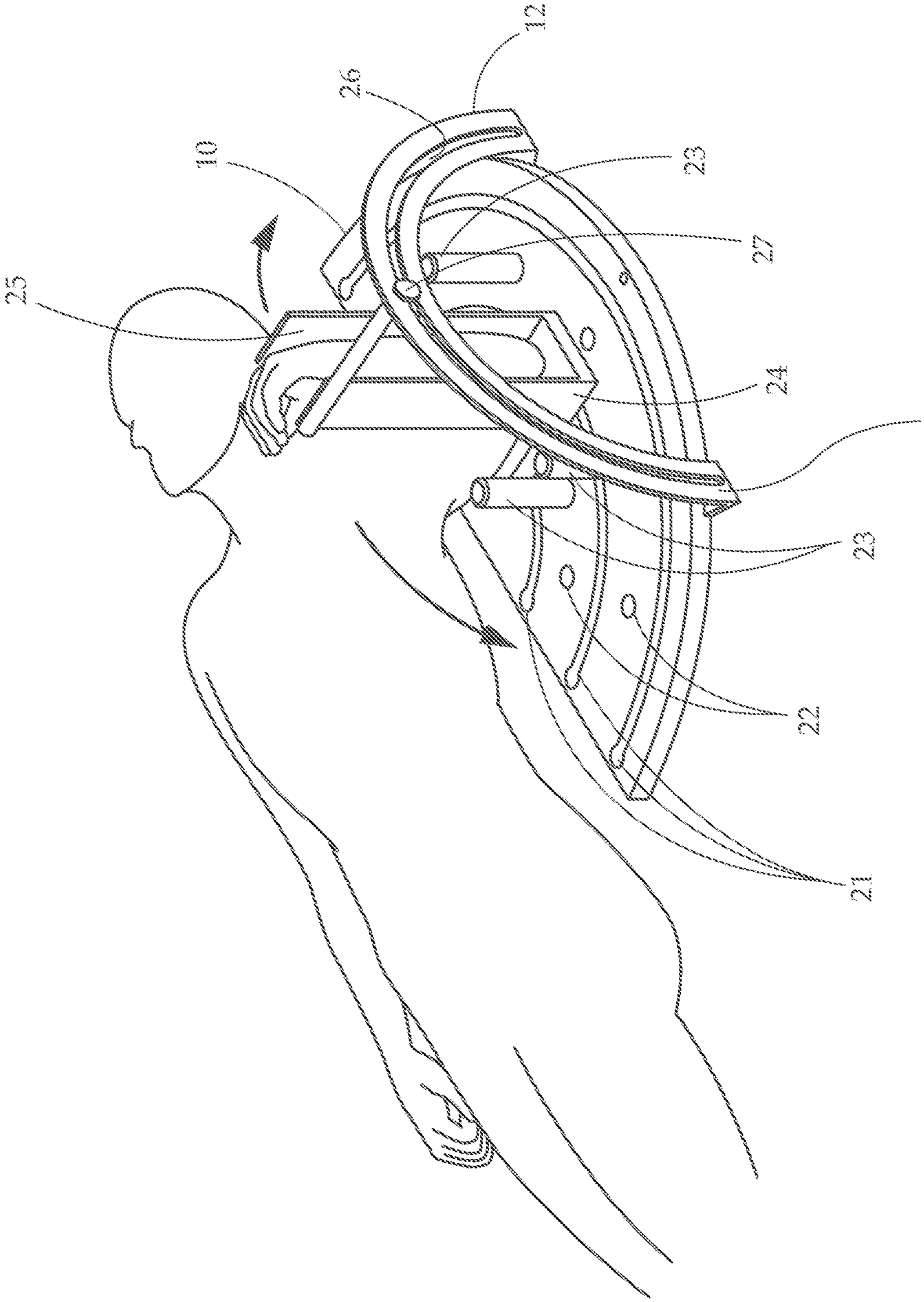
FIG. 2 provides a perspective view of another an embodiment of the present invention.

FIG. 2 shows another embodiment of the present invention in perspective view. As with FIG. 1, the board 10 allows the user's 1 arm to move along its surface guided by tracks 21, and limited in motion by peg 23. Pegs 23 can be placed in various holes 22 across the board depending on the user 1 needs. In this view, the upright forearm portion 25 of the arm stabilizer 24 can be seen. This forearm portion 25 is connected or connectable to slot 26 in track 12 by connector 27. The upright forearm portion 25 may have any shape and structure so long as it provides a support to guide the forearm and/or provide a hand hold. Connector 27 can slide within slot 26. In operation of this embodiment, a user can move their arm towards a top and bottom end of the board 10 as limited by pegs 23. Further, the user can perform a full 180 degrees of internal and external rotation guided by track 12 along the full range of the slot 26. In some embodiments, blockers (not shown) may be positioned on slot 26 to limit this rotational movement.

Figure 3:
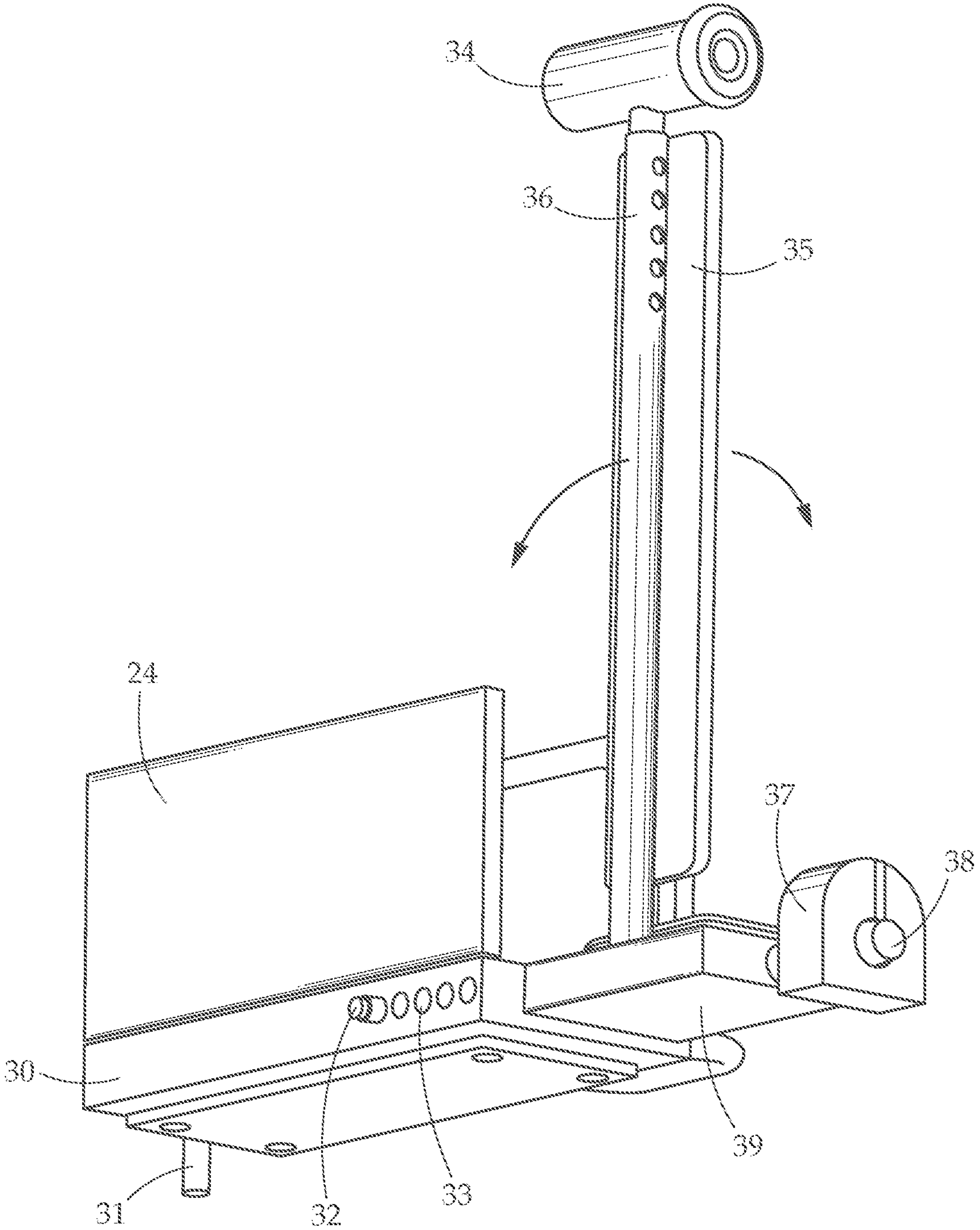
FIG. 3 provides a perspective view of still embodiment of an arm stabilizer of the present invention.

FIG. 3 provides a view of another embodiment of the arm stabilizer. This arm stabilizer 24 is configured to provide controlled internal and external rotation itself, with or without the use the guiding rotation track 12 of the embodiment in FIG. 1. The arm stabilizer 24 has a base 30 which may slide on or above the board (not shown). A dowel 31 or similar shaft extends downward from base 30. This dowel 31 may fit into an aperture on the board (not shown) to allow for pivoting motion of the arm stabilizer 24 about the dowel 31. In other embodiments, any rotation connection (hinged, etc.) may be used to connect the arm stabilizer 24 to the board 10. An upright shaft 36 extends from the base 30 at a pivot area 39. A hand grip 34 allows a user to place their arm against forearm pad 35 to hold the grip. The upright shaft 36, and a forearm on the arm stabilizer 24 can pivot in both directions perpendicularly to the length of the arm stabilizer 24, mimicking the natural internal and external rotation of a shoulder. This movement of the upright shaft 36 is controlled by the axial rotation of shaft 38 as controlled by goniometer 37. Shaft 38, which extends through pivot area 39 into base 30, has limited or free rotation depending on a setting of goniometer 37. Goniometer 37 both measures an angle of upright shaft 36, and also is controllable (through a programming of a microchip, by arranging physical blockers, and the like) to limit rotation in certain ranges, with the maximum range being 180 degrees (90 degrees from each side of the straight up orientation shown). It should be understood that in many other embodiments, the goniometer 38 may be omitted, such that the shaft 38 simply rotates, in either a free or controlled rotation range. The shaft 38 may be anchored in base 30 and/or an end holder at a distal end of the arm stabilizer.

To account for differently sized arms, the width of the arm stabilizer 24 is adjustable. The length may be adjustable via length adjuster 33. For example, in the embodiment shown, length adjuster 33 can be set to move the shaft closer or further from the base 30. A pin 32 holds the length adjusting mechanism in place.

Figure 4:
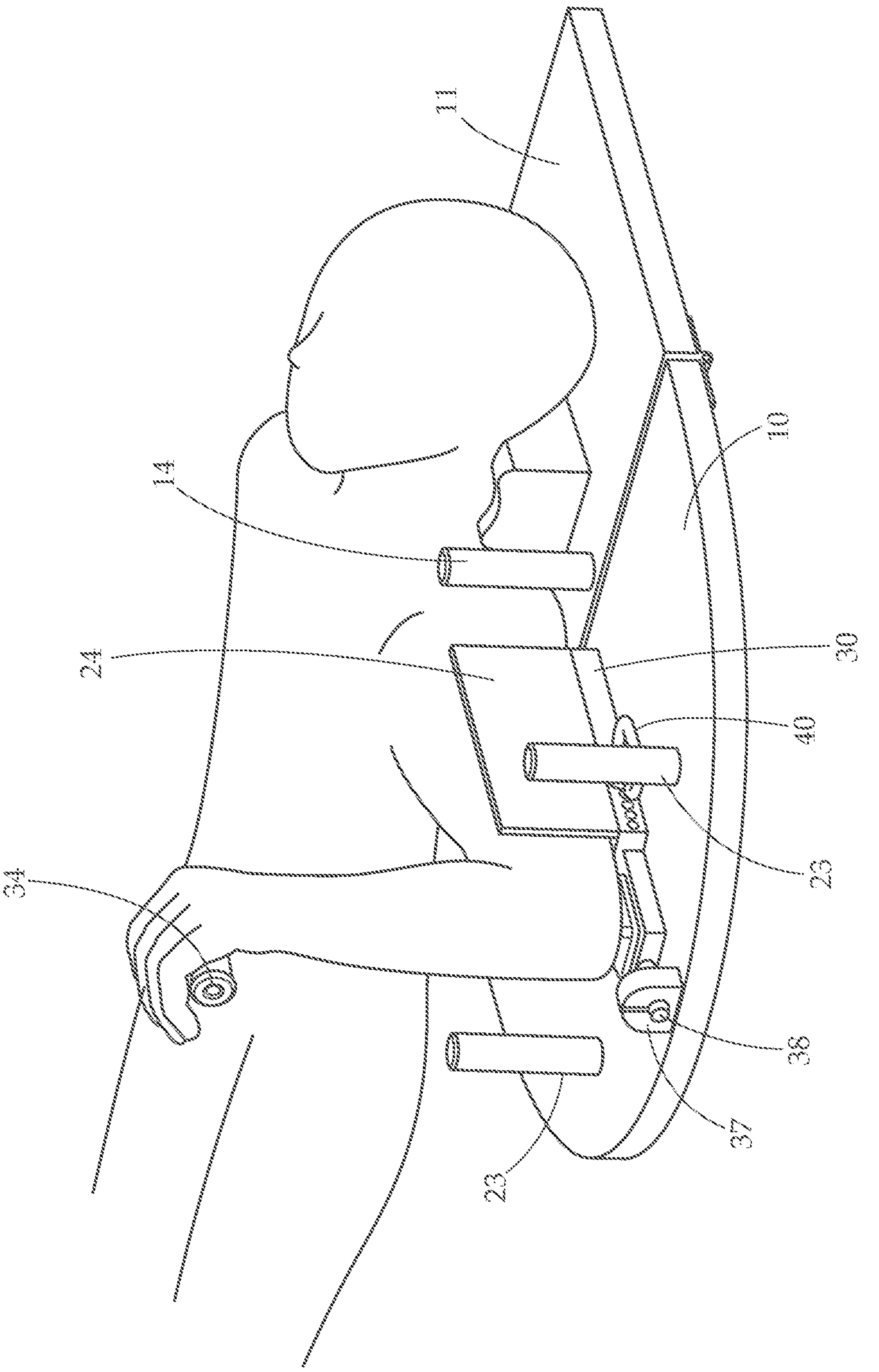
FIG. 4 provides a perspective view of yet another embodiment of the present invention.

FIG. 4 provides a perspective view of another embodiment of the present invention. This embodiment utilizes the arm stabilizer 24 of FIG. 3. The user can be seen resting against table 11. A shoulder peg 14 prevents the user from shrugging the shoulder, thereby holding the shoulder in a proper position. Board 10 is positioned next to the table 11, in this embodiment parallel with the table 11. Pegs 23 limit adduction and abduction of the arm stabilizer 24, and thus of the shoulder. In this view, a handle 40 is seen which is at an opposite side of the length adjusting pin 32.

Figure 5:
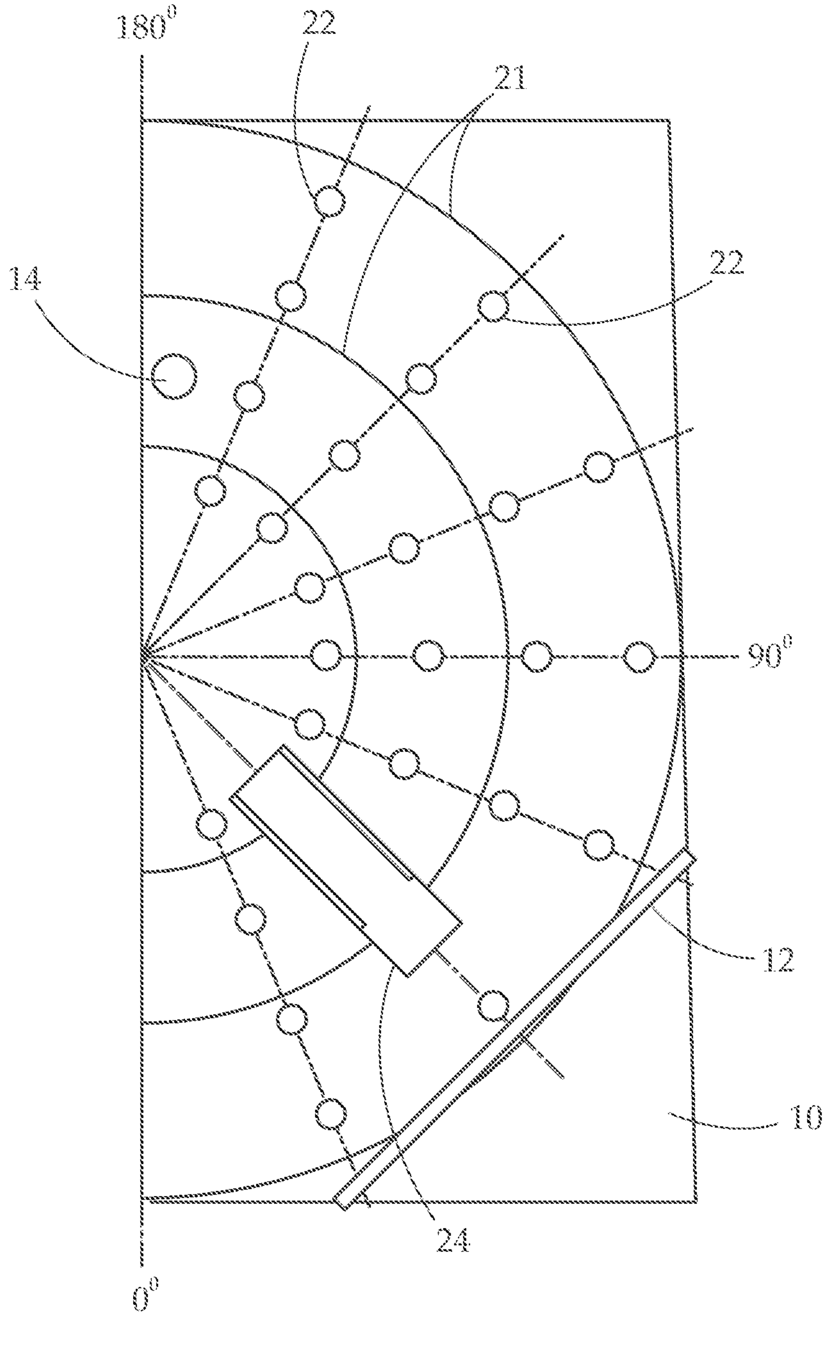
FIG. 5 provides an elevation view of an embodiment of the present invention.

FIG. 5 provides an elevation view of another embodiment of the present invention. In this view, axial rotation track 12 is positioned at a downward 45 degree angle from the straight out position. A number of peg holes 22 extend at the various angles along the board. Similarly, a number of tracks 21 extend along the board to guide movement of arm stabilizer 24. The highly customizable ability of the present invention is highlighted in this view because of the varied positions and movement tracks and limitations thereof that can be seen.

Figure 6:
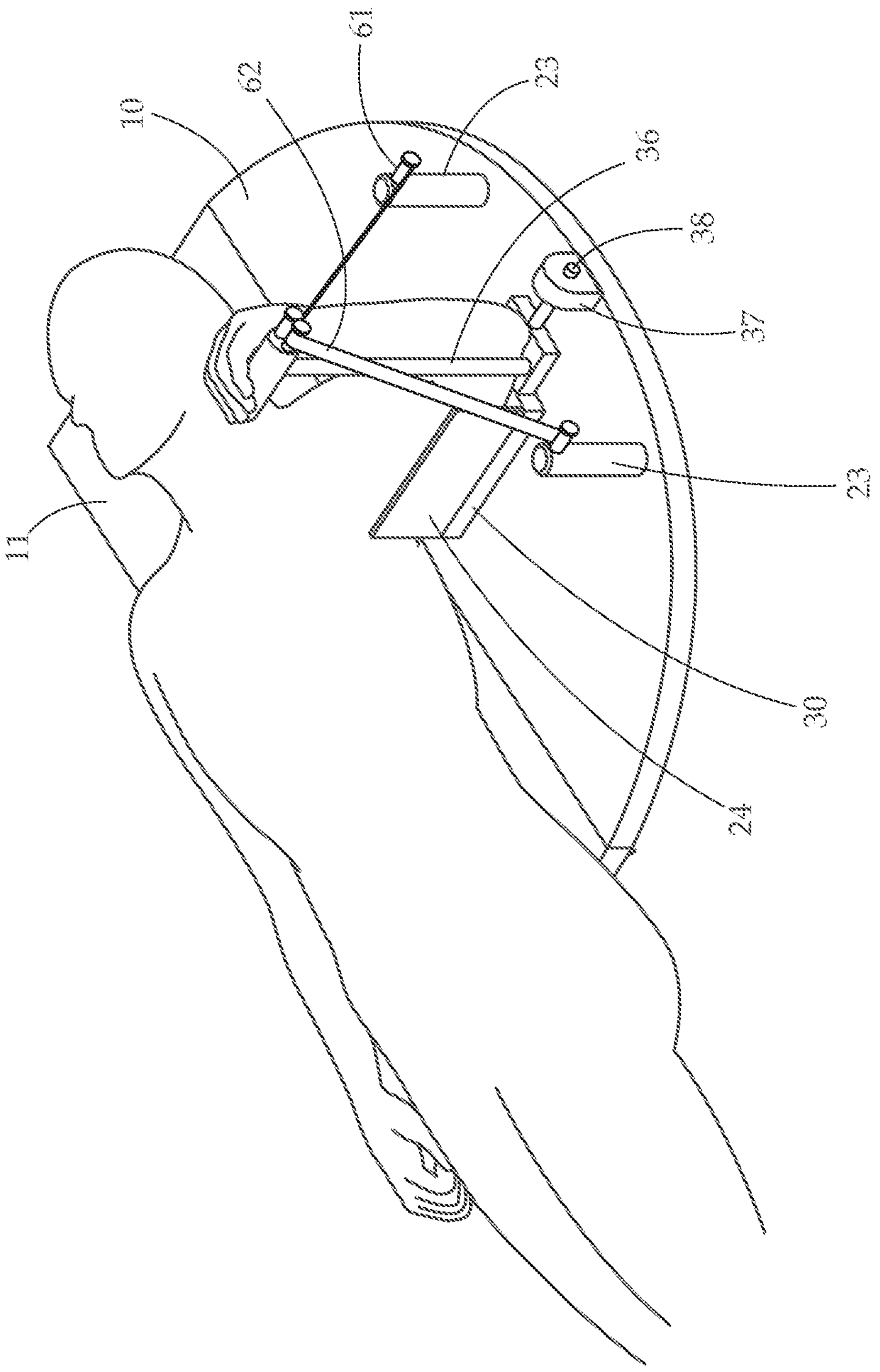
FIG. 6 provides a perspective view of still yet another embodiment of the present invention.

FIG. 6 provides a perspective view of another embodiment of the invention. In this view, a rotational strengthening of the shoulder joint may be achieved. In this embodiment, motion of the arm and shoulder joint may be achieved as discussed in embodiments above. In addition, the embodiment of FIG. 6 further comprises two resistance bands 62 which are formed of an elastic or other stretchable material. These bands 62 allow the user to rotate the shoulder against a predetermined amount of resistance in order to facilitate strengthening. Bands are removably connected, via connector 61, between the pegs 23 attached to the board 10, and hand grip 34. As with other embodiments, the pegs 23 may be moved to various positions along the board 10 depending on stage of rehabilitation or training, and desired range of motion. However in varying embodiments, the bands 62 may be connected to different portions of the arm stabilizer 24 without straying from the scope of this invention. The resistance bands 62 may also be attached to the pegs 23 when the pegs 23 are at various different positions on the board 10.

Figure 7:
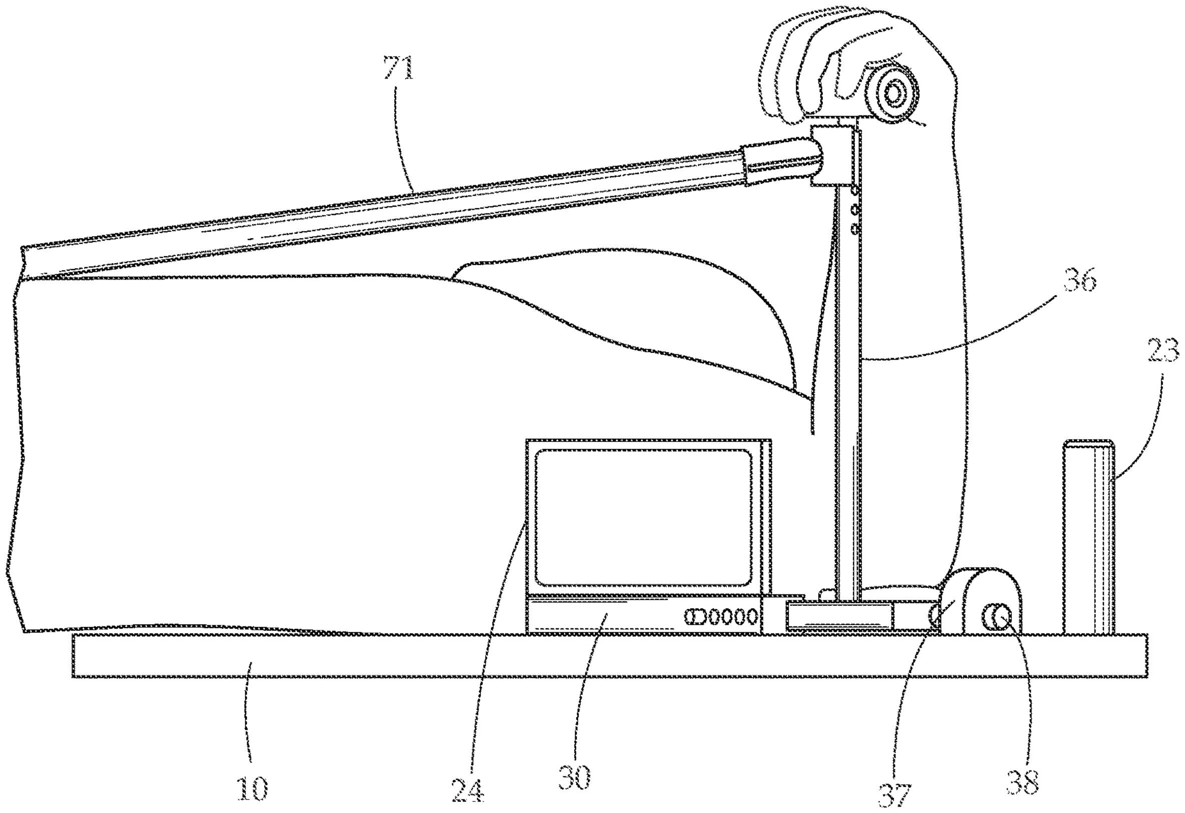
FIG. 7 provides a perspective view of another embodiment of the present invention.

FIG. 7 provides another view of an embodiment of the present invention. In this view, an embodiment similar to that of FIGS. 3 and 4 is shown. However, in this view a dowel 71 is connected to the upright shaft 36. The dowel 71 may be held by an opposite hand of the user, or by a trainer, to urge the arm on the arm stabilizer 24 to move. As shown, the dowel 71 is attached to the shaft 63 near the wrist. However, it should be understood that the dowel 71 may also attach by the elbow, or anywhere else along the shaft 36. The dowel 71 may connect to the shaft 36 in any manner, including a snap fit connection, magnetic connection, and the like. As noted, once connected, a user's healthy arm can move the opposite arm through a range of motion guided by the arm stabilizer 24 pivoting along the board 10 and, optionally, as limited by pegs 23.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

What is claimed is:

1. A method of guided limb movement, comprising:
placing an arm on a limb stabilizer pivotally connected to a limb movement board;
adjusting an angle of the limb movement board; and
moving the limb stabilizer having the arm thereon, as guided by at least one of the pivotal connection of the limb stabilizer or the angle of the limb movement board, to achieve one of an internal or external shoulder rotation, wherein the limb stabilizer comprises an upwardly extended portion movable in a direction towards a top surface of the limb movement board to provide the internal or external shoulder rotation.

2. The method of claim 1, further comprising limiting a range of pivoting motion.

3. The method of claim 2, further comprising blocking the limb stabilizer by a blocker positioned on the limb movement board.

4. The method of claim 3, wherein the blocker is positionable to allow one of the one or more movement ranges to be one of 30 degrees, 45 degrees, 60 degrees, 90 degrees, 120 degrees, 135 degrees, 150 degrees, or 180 degrees.

5. The method of claim 1, further comprising adjusting the angle to move the arm into a plane of a scapula of a user.

6. The method of claim 1, wherein the upwardly extended portion is pivotally connected to the limb stabilizer and the method further comprises pivoting the limb stabilizer to move in a direction towards the top surface of the limb movement board.

7. The method of claim 1, further comprising moving a dowel removably connected to the upwardly extended portion to thereby move the upwardly extended portion.

8. The method of claim 1, further comprising moving the limb movement board relative to a table to which the limb movement board is connected.

9. The method of claim 8, wherein the table is connected to a wall or a floor.

10. The method of claim 1, further comprising moving the limb stabilizer against a predetermined added resistance.

11. The method of claim 1, further comprising preventing a shoulder from shrugging upward by blocking movement of the shoulder.

12. The method of claim 1, further comprising moving a dowel removably connected to the limb stabilizer to thereby move the limb stabilizer.

13. A method of guided limb movement, comprising:
placing a limb on a limb stabilizer pivotally connected to a limb movement board;
adjusting an angle of the limb movement board;
moving the limb stabilizer having the limb thereon as guided by at least one of the pivotal connection of the limb stabilizer or the angle of the limb movement board; and
recording a measurement of a goniometer in communication with the limb stabilizer to measure a rotational angle of the limb stabilizer relative to the pivotal connection to the limb movement board.

14. A method of guided limb movement, comprising:
placing an arm on a limb stabilizer pivotally connected to a limb movement board comprising preventing a shoulder from shrugging upward by blocking movement of the shoulder;
adjusting an angle of the limb movement board; and
moving the limb stabilizer having the arm thereon, as guided by at least one of the pivotal connection of the limb stabilizer or the angle of the limb movement board, comprising limiting a range of pivoting motion.

15. The method of claim 14, further comprising moving a dowel removably connected to the limb stabilizer to thereby move the limb stabilizer.

16. The method of claim 14, wherein the limb stabilizer comprises an upwardly extended portion movable in a direction towards a top surface of the limb movement board to provide internal or external rotation for a shoulder.

17. The method of claim 15, wherein an upwardly extended portion is pivotally connected to the limb stabilizer and the method further comprises pivoting the limb stabilizer to move in a direction towards a top surface of the limb movement board.

18. The method of claim 14, further comprising moving the limb movement board relative to a table to which the limb movement board is connected.

* * * * *